United States Patent Office 2,919,226
Patented Dec. 29, 1959

2,919,226
PRESERVATIVE USE OF 4-HYDROXY-3,5-DIMETHOXYALLYLBENZENE

Irving Levi, Montreal, Quebec, Canada, assignor to Charles E. Frosst & Co., Montreal, Canada, a corporation of Quebec No Drawing. Application November 8, 1957
Serial No. 695,189

1 Claim. (Cl. 167—30)

The present invention relates to a novel composition of matter possessing antiseptic properties and particularly effective as a mosquito repellent, larvicide, fungicide and as an inhibitor of acid formation by the organisms and enzymes present in saliva.

It has unexpectedly been found in accordance with the present invention that 4-hydroxy-3,5-dimethoxy-allylbenzene is particularly effective when mixed with a carrier to repel mosquitoes, destroy larva, inhibit the growth of fungus and also to inhibit the formation of acids by organisms and enzymes present in saliva.

The following examples will illustrate the use of the composition of the present invention:

EXAMPLE 1
Mosquito repellent

Mercerized cloth hose was impregnated with a solution of one gram of 4-hydroxy-3,5-dimethoxy-allylbenzene in 10 ml. of acetone and dried. The impregnation was carried out in such a manner that the dried hose contained approximately 3.3 grams of the effective compound per square foot of hose. The dried hose was drawn over the arms of the test personnel, who then thrust their covered arms into cages containing adult mosquitoes, Aëdes aegypti, for one minute. If no bites or less than five bites were received, the test was repeated each successive day until five or more bites during one exposure were received.

It was found that fabric impregnated with the 4-hydroxy-3,5-dimethoxy-allylbenzene remained repellent to Aëdes aegypti for more than 21 successive days.

For ease of application to the skin, the 4-hydroxy-3,5-dimethoxy-allylbenzene may be incorporated in a suitable inert liquid or solid carrier such as mineral oil, alcohol, petrolatum, etc.

For ease and uniformity of application to the fabric the 4-hydroxy-3,5-dimethoxy-allylbenzene may be applied to the fabric in an inert solvent such as alcohol, acetone, ether, etc.

EXAMPLE 2
Mosquito larvicide

Twenty larvae of Anopheles quadrimaculatus were placed in 250 ml. of distilled water containing 10 p.p.m. of 4-hydroxy-3,5-dimethoxy-allylbenzene (2.5 ml. of acetone solution with 2.5 mg. of test compound). In 48 hours the mortality rate of the larvae was 76 percent.

EXAMPLE 3
Fungicide (a) The test compound was dissolved in acetone in ten fold dilutions (10,000 p.p.m. to 10 p.p.m.). An 0.2 cc. aliquot of each concentration was placed in a depression slide cavity (0.4 cc. volume). The drops were dried to deposit the 4-hydroxy-3,5-dimethoxy-allylbenzene as residues on the bottom of the cavities. The concentration of the residues in the slides cavities were 1000, 100, 10 and 1 mcg./sq. cm. respectively. The cavities were then filled with spore suspensions made from 14 day old cultures of Stemphylium sarcinaeforme and 7 day old cultures of Sclerotinia fructicola. Slides were incubated for 17 hours, and evaluations were made in terms of percent inhibition of spore germination at each concentration. It was found, as shown in the table below that 4-hydroxy-3,5-dimethoxy-allylbenzene completely (100%) inhibited the germination of spores of Stemphylium sarcinaeforme at a concentration of 1,000 mcg./sq. cm., and spores of Sclerotinia fructicola at a concentration of 1 mcg. per sq. cm.

TABLE 1.—PERCENT INHIBITION OF FUNGI SPORES BY 4-HYDROXY-3,5-DIMETHOXY-ALLYL-BENZENE

|  | 1,000 | 100 | 10 | 1 |
|---|---|---|---|---|
| Stemphylium sarcinaeforme | 100 | 0 | 0 | 0 |
| Sclerotinia fructicola | 100 | 100 | 100 | 100 |

(b) Nutrient-toxic-agar containing 250 p.p.m. of 4-hydroxy-3,5-dimethoxy-allylbenzene was inoculated with one drop of spore suspension (5 ml. aliquot in 95 ml. of distilled water and melting agent) of Aspergillus niger (TC–215–4347 Steinberg). Plates containing the above were incubated at 30° C. for 96 hours after which time it was found that growth of the fungus was inhibited to the extent of 59% compared to normal controls.

EXAMPLE 4
Inhibition of acid formation by salivary sediment

Salivary sediment, containing the organisms Streptococcus salivarius, Streptococcus mitis and Lactobacillus casei, as well as undetermined enzymes, was obtained by centrifuging saliva. A series of pH differentials were determined between the sediment and a buffered glucose solution, between the sediment and a buffered glucose solution containing 4-hydroxy-3,5-dimethoxy-allylbenzene (half saturated in 10% propylene glycol) and finally between the sediment and fresh buffered glucose solutions.

From these recorded pH differentials it was determined that 4-hydroxy-3,5-dimethoxy-allylbenzene had a moderate activity in the inhibition of acid formation by salivary sediment.

We claim:

The method of destroying larva and fungi and inhibiting the formation of acids by organisms and enzymes present in saliva, comprising applying to a host, an effective amount of 4-hydroxy-3,5-dimethoxy-allylbenzene.

References Cited in the file of this patent
UNITED STATES PATENTS 2,470,906   Taylor _____ May 24, 1949
2,516,412   Pearl _____ July 25, 1950

OTHER REFERENCES

J.A.P.A., Sci. Ed., art. by Manly et al., June 1956, pp. 389–391.

Antiseptics, Disinfectants, Fung., and Sterilization, ed. by Reddish, Lea and Fibiger, Phila., 1954, pp. 373–74.